UNITED STATES PATENT OFFICE.

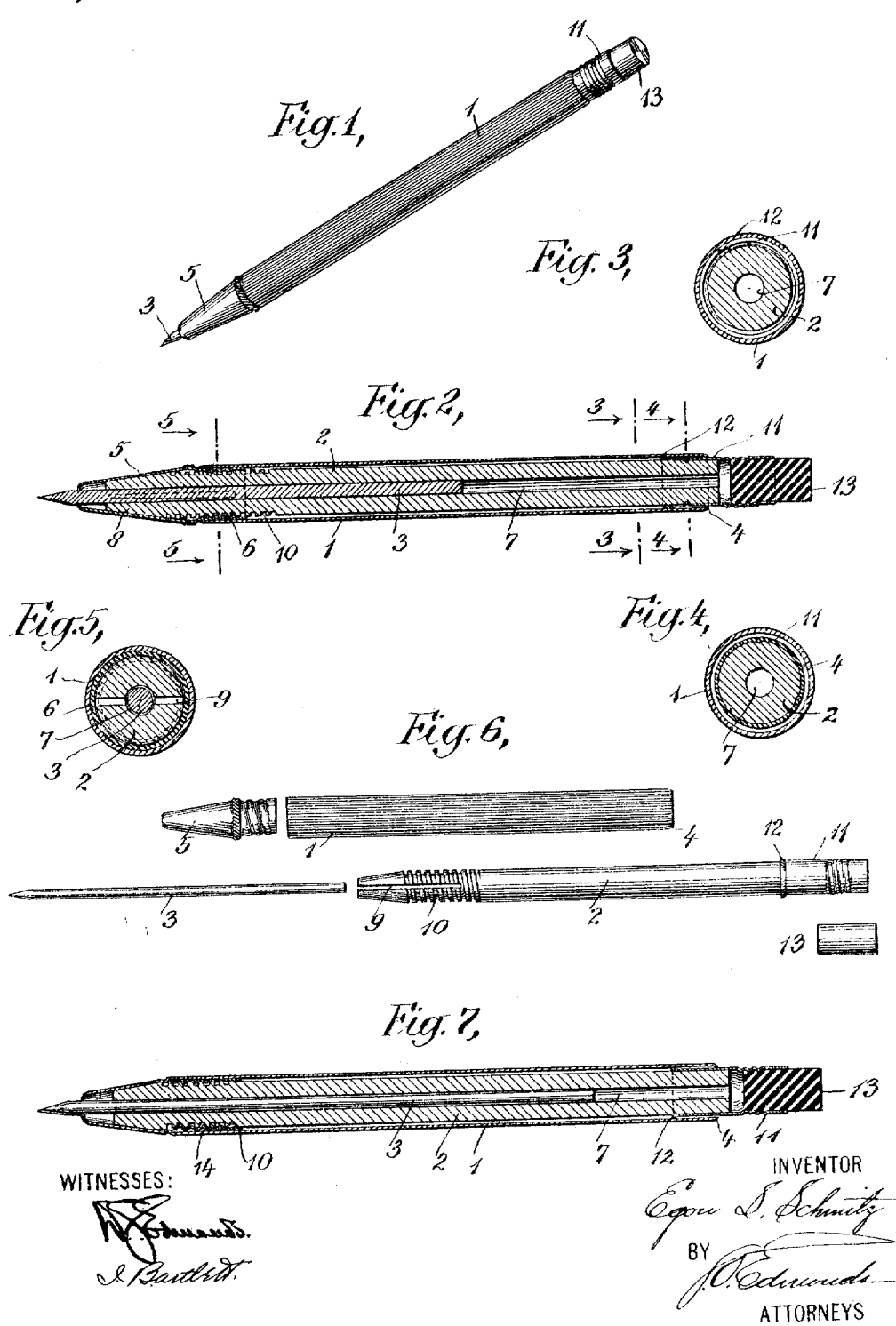

EGON L. SCHMITZ, OF NEW YORK, N. Y., ASSIGNOR TO EBERHARD FABER PENCIL COMPANY, OF BROOKLYN, NEW YORK, A CORPORATION OF NEW YORK.

PENCIL.

945,422.  Specification of Letters Patent.  Patented Jan. 4, 1910.

Application filed December 8, 1908. Serial No. 486,573.

*To all whom it may concern:*

Be it known that I, EGON L. SCHMITZ, a citizen of the United States, residing in the city, county, and State of New York, have invented a certain new and useful Improvement in Pencils, of which the following is a specification.

This invention relates to pencils of the type having a stick of lead movable within a holder and clamping devices for gripping the lead-stick and holding it with its end projecting beyond the end of the holder.

The invention is directed to the provision of an improved pencil of this type which has the shape of an ordinary sharpened pencil and is, therefore, more convenient to use, which is of attractive appearance, in which the lead-stick is held firmly either within the holder or with its end projecting beyond the holder so that danger of breaking of the lead is reduced to a minimum, in which the parts of the completed pencil cannot be disassembled, and which may be manufactured at small cost.

The preferred embodiment of the invention is illustrated in the accompanying drawings, in which—

Figure 1 is a perspective view of the pencil, Fig. 2 is a central longitudinal section of the same, Figs. 3, 4 and 5 are transverse sections on lines 3—3, 4—4 and 5—5 of Fig. 2, Fig. 6 shows the several parts of the pencil detached, in elevation, and Fig. 7 is a central longitudinal section of a slightly modified form of the invention.

Referring to these drawings, the pencil consists of a tubular casing 1, within which is a lead-holding member 2, having a bore to receive the lead-stick and clamping devices for gripping the stick to hold it in proper position, and the stick of lead 3 the end of which projects beyond the end of the member 2 and the casing 1. The casing 1 is a thin tube, preferably made of metal, uniform in cross-section throughout its length, except that at one end it is provided with a flange 4 turned inwardly slightly. At the other end of the casing 1, is a tubular piece 5 of any suitable material, preferably metal, having tapering walls, one end of which is adapted to fit within the end of the casing 1. The portion 6 of the tubular extension 5 of the casing which fits within the casing 1 has a thread formed therein, and this portion 6 of the member 5 is secured to the end of the casing 1. The lead-holder 2 is made of a material possessing elasticity such as wood and has an axial bore therein, as shown at 7, to receive the stick of lead 3. At one end, 8, the holder 2 is tapered to correspond with the taper of the member 5, and this end of the holder is provided with a lengthwise slot 9 so as to form clamp-jaws at this end of the holder 2, one on either side of the slot 9. Adjacent to this end, the holder 3 is threaded as shown at 10 to correspond with the threads formed in the member 5. To the opposite end of the lead-holder 2, is secured a tubular metallic cap 11, one end of which is provided with an outwardly turned flange 12 adapted to coact with the flange 4 on the casing 1, to preclude the withdrawal of the lead-holding member 2 from within the casing 1. The end of cap 11 may be finished off in any suitable manner. It is here shown as adapted to hold a rubber 13.

In assembling the parts, the cap 11 is secured upon the end of the holder 2, as shown in Fig. 6, and the end of the holder which is provided with the cap is then inserted in the left end of the casing 1 and the holder moved to the right until it lies within the casing 1 in the relation in which those parts are shown in Fig. 2. The flange 12 on the cap 11 is of such size that it will pass freely within the casing 1, but will coact with the flange 4 on the casing to preclude movement of flange 12 past flange 4. With the parts in this position, the tubular piece 5 is inserted over the end of the holder 2 and its threaded end is moved within the end of the casing 1, by screwing the piece up upon the threads of the holder 2, until the piece 5 and casing 1 are in the positions in which they are shown in Fig. 2. The overlapping portions of these two parts are then secured together in any suitable manner, as by brazing them together or merely subjecting them to pressure sufficient to hold them together. The stick of lead 3 is then inserted through the opening in the end of the piece 5 into the bore 7 of the holder 2. As thus constructed, it will be seen that by turning the lead-holder 2 at the end 11 thereof which projects beyond the end of the casing 1, the coacting threads 10 and 6 on the holder 2 and piece 5 will cause the holder to be moved axially within the casing 1, so as to force the clamp-jaws at the end of the holder 2 against the interior tapering walls of the piece 5 and thus cause these clamp-jaws to grip the stick of lead 3 between them. The clamp-jaws are of considerable length and therefore grip the stick of lead over a substantial area; for this reason, and for the reason that the clamp-jaws are made of a material such as wood, the danger of breaking the stick of lead when gripping it by the clamp-jaws is reduced to a minimum.

The shape of the casing may be such that the pencil is convenient to use and of attractive appearance and the simplicity of the construction and the small number of parts permit of manufacturing it at very low cost.

The provision of the means for precluding withdrawal of the holder from the casing, consisting of a flange on the projecting end of the holder and a coacting flange on the adjacent end of the casing, is of great importance since it prevents the user of the pencil from disassembling the parts.

The structure above described may be modified in many respects without departing from the spirit of my invention. Thus there is shown in Fig. 7 an embodiment of the invention in which the body of the casing and the tapered end portion are integral but the thread 14 on the interior wall of the casing is separately formed and secured in position in any suitable manner. In other respects the pencil of Fig. 7 is like that of Fig. 2. The thread need not be located adjacent to the point end of the pencil but may be at any desired point along the length of the holder, it being only necessary that this thread operate to force the holder forward and cause the clamp-jaws to be contracted upon the lead and that it be so located as to permit of forming the parts to preclude withdrawal of the holder from the casing.

Having now described my invention, what I claim as new therein and desire to secure by Letters Patent is as follows:—

1. A pencil comprising a tubular casing, a tapered end portion at one end of said casing, a screw-thread formed separately from said casing and mounted within the same so that the threads thereof do not show on the exterior of the casing, a lead-holder extending within the casing and having clamp-jaws at one end thereof engaging the interior walls of said tapered portion and the other end projecting beyond the opposite end of the casing, said holder having an axial bore and being threaded to coact with said thread on the casing, a stick of lead in said bore, and coöperating flanges on said projecting end of the holder and the adjacent end of the casing for precluding withdrawal of the holder from the casing, substantially as set forth.

2. A pencil comprising a tubular metallic casing, a tapered end portion secured to one end of the casing, a screw-thread formed integral with said tapered end portion and extending within said tubular casing, a lead-holder extending within the casing and having clamp-jaws at one end thereof engaging the interior walls of said tapered portion, the other end projecting beyond the opposite end of the casing, said holder having an axial bore and being threaded to coact with said thread on the casing, a stick of lead in said bore, and coöperating flanges on said projecting end of the holder and the adjacent end of the casing for precluding withdrawal of the holder from the casing, substantially as set forth.

This specification signed and witnessed this 23rd day of Novbr., 1908.

EGON L. SCHMITZ.

Witnesses:
 D. S. EDMONDS,
 I. BARTLETT.